(12) United States Patent
Melamed et al.

(10) Patent No.: US 7,849,444 B2
(45) Date of Patent: Dec. 7, 2010

(54) TEST EXECUTIVE WITH BUFFER OVERWRITE DETECTION FOR PARAMETERS OF USER-SUPPLIED CODE MODULES

(75) Inventors: Douglas Melamed, Austin, TX (US); Scott Richardson, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1666 days.

(21) Appl. No.: 11/081,235

(22) Filed: Mar. 16, 2005

(65) Prior Publication Data

US 2006/0136876 A1    Jun. 22, 2006

Related U.S. Application Data

(60) Provisional application No. 60/637,997, filed on Dec. 21, 2004.

(51) Int. Cl.
*G06F 9/44* (2006.01)
*G06F 13/00* (2006.01)

(52) U.S. Cl. .................. 717/124; 717/126; 711/170
(58) Field of Classification Search .................. 717/127
See application file for complete search history.

(56) References Cited

U.S. PATENT DOCUMENTS

| | | | |
|---|---|---|---|
| 5,410,685 A | 4/1995 | Banda et al. | |
| 5,583,988 A | 12/1996 | Crank et al. | |
| 5,590,329 A | 12/1996 | Goodnow, II et al. | |
| 5,625,819 A | 4/1997 | Hoffer, Jr. | |
| 6,110,227 A | 8/2000 | Marcelais et al. | |
| 6,397,378 B1 * | 5/2002 | Grey et al. | 717/175 |
| 6,401,220 B1 | 6/2002 | Grey et al. | |
| 6,438,713 B1 | 8/2002 | Taira et al. | |
| 6,473,707 B1 | 10/2002 | Grey | |
| 6,507,842 B1 | 1/2003 | Grey et al. | |
| 6,577,981 B1 | 6/2003 | Grey et al. | |
| 6,578,094 B1 * | 6/2003 | Moudgill | 710/57 |
| 6,598,181 B1 | 7/2003 | Pennell | |

(Continued)

OTHER PUBLICATIONS

Piromsopa et al., "Defeating Buffer-Overflow Prevention Hardware", Jun. 18, 2006, total pp. 8, retrieved from <http://www.ece.wisc.edu/~wddd/2006/papers/wddd_07.pdf>.*

*Primary Examiner*—Tuan Q Dam
*Assistant Examiner*—Marina Lee
(74) *Attorney, Agent, or Firm*—Meyertons Hood Kivlin Kowert & Goetzel, P.C.; Jeffrey C. Hood; Jason L. Burgess

(57) ABSTRACT

A test executive sequence may be created by including a plurality of test executive steps in the test executive sequence and configuring at least a subset of the steps to call user-supplied code modules. One or more of the user-supplied code modules may take buffer parameters. The test executive sequence may be executed on a host computer under control of a test executive engine. When executing each step in the test executive sequence that calls a user-supplied code module that takes a buffer parameter, the test executive engine may be operable to perform several operations related to detecting a situation where the user-supplied code module writes outside the bounds of the buffer parameter and/or preventing the user-supplied code module from corrupting heap data if the user-supplied code module writes outside the bounds of the buffer parameter.

32 Claims, 9 Drawing Sheets

U.S. PATENT DOCUMENTS

| | | | |
|---|---|---|---|
| 6,634,020 B1 * | 10/2003 | Bates et al. | 717/131 |
| 6,658,649 B1 | 12/2003 | Bates et al. | |
| 6,658,651 B2 | 12/2003 | O'Brien et al. | |
| 6,658,653 B1 * | 12/2003 | Bates et al. | 717/131 |
| 6,671,825 B1 | 12/2003 | Joshi et al. | |
| 6,675,379 B1 * | 1/2004 | Kolodner et al. | 717/155 |
| 6,754,850 B2 | 6/2004 | Grey et al. | |
| 6,829,733 B2 | 12/2004 | Richardson et al. | |
| 6,868,508 B2 | 3/2005 | Grey | |
| 6,907,557 B2 | 6/2005 | Perez et al. | |
| 6,971,084 B2 | 11/2005 | Grey et al. | |
| 6,993,663 B1 * | 1/2006 | Paya et al. | 711/163 |
| 7,272,748 B1 * | 9/2007 | Conover et al. | 714/20 |
| 7,328,323 B1 * | 2/2008 | Conover | 711/170 |
| 7,370,182 B2 * | 5/2008 | Cofler et al. | 712/234 |
| 7,380,245 B1 * | 5/2008 | Lovette | 718/100 |
| 7,404,182 B1 * | 7/2008 | Garthwaite et al. | 717/140 |
| 7,484,069 B2 * | 1/2009 | Williams | 711/201 |
| 7,512,765 B2 * | 3/2009 | Kurtz | 711/170 |
| 7,519,867 B2 * | 4/2009 | Grey | 714/38 |
| 7,730,453 B2 * | 6/2010 | Swafford | 717/124 |
| 2002/0122062 A1 | 9/2002 | Melamed et al. | |
| 2002/0124042 A1 | 9/2002 | Melamed et al. | |
| 2003/0046016 A1 | 3/2003 | Grey et al. | |
| 2003/0046612 A1 * | 3/2003 | Grey | 714/38 |
| 2003/0069876 A1 | 4/2003 | Richardson | |
| 2003/0145252 A1 | 7/2003 | Grey et al. | |
| 2003/0145280 A1 | 7/2003 | Grey et al. | |
| 2003/0182601 A1 | 9/2003 | Richardson | |
| 2004/0093180 A1 | 5/2004 | Grey et al. | |
| 2004/0113947 A1 | 6/2004 | Ramchandani | |
| 2004/0143830 A1 | 7/2004 | Gupton et al. | |
| 2005/0144412 A1 * | 6/2005 | Swafford et al. | 711/170 |
| 2006/0136876 A1 * | 6/2006 | Melamed et al. | 717/124 |
| 2006/0143527 A1 | 6/2006 | Grey et al. | |
| 2006/0143536 A1 | 6/2006 | Grey | |
| 2006/0143537 A1 | 6/2006 | Grey | |
| 2007/0101317 A1 * | 5/2007 | Shoji et al. | 717/131 |
| 2008/0133858 A1 * | 6/2008 | Enbody et al. | 711/163 |

* cited by examiner

| Step | Description | Execution Flow | Comment |
|---|---|---|---|
| Power On | Numeric Limit Test, 12 <= x <= 15, volt, Call P... | Precondition | |
| CPU | Call MainSequence in cpu.seq | | |
| ROM | Pass/Fail Test, Call ROMTest (computer.dll) | Precondition | |
| RAM | Pass/Fail Test, Call RAMTest (computer.dll) | Precondition | |
| Video | Numeric Limit Test, 70 <= x <= 75, hertz, Call ... | Precondition | |
| Keyboard | Pass/Fail Test, Call KeyboardTest (computer.dll) | Precondition | |
| ROM Diagnostics | Action, Call ROMDiagnostics (computer.dll) | Precondition | |
| RAM Diagnostics | Action, Call RAMDiagnostics (computer.dll) | Precondition | |
| Video Diagnostics | Action, Call VideoDiagnostics (computer.dll) | Precondition | |
| Keyboard Diagnostics | Action, Call KeyboardDiagnostics (computer.dll) | Precondition | |
| END | | | |

FIG. 4

TEST EXECUTIVE WITH BUFFER OVERWRITE DETECTION FOR PARAMETERS OF USER-SUPPLIED CODE MODULES

PRIORITY CLAIM

This application claims benefit of priority of U.S. Provisional Application Ser. No. 60/637,997 titled "Test Executive with Features for Detecting and Preventing Errors in User-Supplied Code Modules Called by Steps of a Test Executive Sequence," filed Dec. 21, 2004, whose inventors were James A. Grey, Erik Crank, Douglas Melamed, and Scott Richardson.

FIELD OF THE INVENTION

The present invention relates to the field of test executive software for organizing and executing test executive sequences. In particular, the invention relates to a system and method for buffer overwrite detection and/or prevention for parameters of user-supplied code modules called by steps of a test executive sequence.

DESCRIPTION OF THE RELATED ART

Test executive software is specialized software that allows a user to create and execute test executive sequences to test units under test (UUTs). The test executive software operates as a control center for an automated test system. More specifically, the test executive software allows the user to create, configure, and control execution of test executive sequences for various test applications, such as production and manufacturing test applications. Text executive software typically includes various features such as test sequencing based on pass/fail results, logging of test results, and test report generation, among others.

A test executive sequence may include a plurality of steps, and one or more of the steps may call user-supplied code modules, also referred to herein as test modules. As used herein, a user-supplied code module or test module refers to a software module that is written or supplied by a user of the test executive software. The user may construct various test modules designed to perform tests on a UUT, and execution of these test modules may be invoked by steps in a test executive sequence when the sequence is executed. For example, the test modules may interact with one or more hardware instruments to test the UUT(s).

The test executive software typically includes a sequence editor for creating test executive sequences and a test executive engine operable to execute the test executive sequences. Executing a test executive sequence may comprise executing each of the steps in the test executive sequence, e.g., executing each of the steps according to an order defined by the test executive sequence.

For each step in the test executive sequence that calls a user-supplied code module, executing the step may comprise both executing program instructions of the test executive engine and executing the user-supplied code module. For example, in addition to calling a user-supplied code module, a step in a test executive sequence may also perform additional functionality, where the additional functionality is implemented by the test executive engine and not coded by the user. For example, the step may be operable to perform common functionality which is useful for various automated test applications, where the common functionality is implemented by the test executive engine. This may remove the burden on the user from implementing this functionality for the step, thus increasing the user's ease and efficiency of creating the automated test system.

As one example, the test executive engine may implement automatic result collection for a step in a test executive sequence. For example, when the step is executed during execution of the test executive sequence, the test executive engine may first invoke execution of a user-supplied code module called by the step. The user-supplied code module may execute to perform a specific test of a UUT. The user-supplied code module may conform to a programming interface through which its execution results can be passed back to the test executive engine. When the user-supplied code module finishes execution, the test executive engine may be operable to automatically receive the execution results of the module and log them in a report file or database. Thus, in this example, the user may implement the specific test functionality performed by the user-supplied code module but may not be required to implement the functionality of logging the execution results of the user-supplied code module since the logging is performed automatically by the test executive engine.

In some instances a test executive sequence may also include one or more steps that do not call user-supplied code modules. For example, the functionality of some steps may be implemented entirely by the test executive engine and may not be coded by the user. However, the test executive software, e.g., the sequence editor, may allow the user to set various properties or parameters affecting operation of the steps, e.g., by interacting with a dialog box or other graphical user interface associated with the steps.

Bugs or errors in user-supplied code modules may cause a test executive sequence to crash when it is executed or to exhibit other problematic behavior. Because test executive sequence execution involves executing both program instructions of the test executive engine and program instructions of user-supplied code modules, it can be difficult for users to determine the source of the error. For example, memory corruption caused by a user-supplied code module can lead to a crash or odd behavior that happens long after the user-supplied code module finishes execution.

The symptoms of problems caused by bugs in user-supplied code modules can be intermittent, difficult to reproduce, and subject to changing or to temporarily disappearing when anything about the system is modified, including modifications intended to help diagnose the problem. Because of this lack of repeatability, these types of bugs are among the most difficult to resolve. They are often referred to as "Heisenbugs", because any attempt to narrow down the problem can change the problem symptoms, somewhat analogous to how any attempt to more accurately determine the location of an electron only makes its momentum more uncertain (from the Heisenberg uncertainty principle).

These type of bugs also have an additional problem in that when they occur due to user-supplied code that is run within the test executive engine's process space, a resulting crash in the test executive application can be interpreted by the user as a vendor bug. This can distract the user from focusing on where the problem is really located and can create a mistaken bad impression of the vendor's test executive application.

One common type of error caused by user-supplied code modules is corrupting or overwriting heap data. A heap may comprise a memory pool or store from which memory can be dynamically allocated at runtime during execution of a program. For example, blocks of memory of dynamically determined sizes can be allocated from the heap in an arbitrary order. A memory block allocated from the heap typically remains allocated until it is explicitly de-allocated either by the programmer or by a garbage collector.

For example, heap corruption can occur when a user-supplied code module has a bug causing it to overwrite control information that memory management functions use to control heap usage. Each block of allocated storage within the heap may include a data area as well as a control area adjacent to the data area. For example, the control area may be used by the memory management functions to free the storage properly when the storage is de-allocated. If a user-supplied code module that is called by a step in the test executive sequence overwrites a control structure in the heap then the control information may become corrupted, which may cause errors to occur in execution of the test executive sequence. It is also possible for the user-supplied code module to corrupt or overwrite data on the heap other than control information. For example, the user-supplied code module may overwrite data within a memory block that has been allocated on the heap. For example, the memory block may have been allocated by the test executive engine or by another user-supplied code module. Both control information on the heap and data within memory blocks that have been allocated on the heap are referred to hereinafter simply as heap data.

One common bug that causes heap data to be corrupted (i.e., overwritten) is when a user-supplied code module writes beyond the bounds of a buffer or array that has been allocated on the heap. In some cases, a user-supplied code module may receive a buffer as a parameter and may overwrite the buffer parameter, thus causing other heap data to be overwritten.

SUMMARY

Various embodiments of the invention comprise a system and method for automatically detecting a situation where a user-supplied code module called by a step in a test executive sequence writes outside the bounds of a buffer parameter and/or preventing the user-supplied code module from corrupting heap data if the user-supplied code module writes outside the bounds of the buffer parameter.

The test executive sequence may first be created by including a plurality of test executive steps in the test executive sequence and configuring at least a subset of the steps to call user-supplied code modules. For example, a user may interact with a sequence editor which provides a graphical user interface for creating and configuring the test executive sequence. Each of the user-supplied code modules called by steps of the test executive sequence may take parameters of various data types. In particular, one or more of the user-supplied code modules may take one or more buffers as parameters.

The test executive sequence may be executed on a host computer, e.g., may be executed under control of a test executive engine. Executing the test executive sequence may comprise the test executive engine executing each of the steps in the test executive sequence. When executing each step in the test executive sequence that calls a user-supplied code module that takes a buffer parameter, the test executive engine may be operable to perform several operations.

In one embodiment the step may have "pre-functionality" that is implemented by the test executive engine, i.e., functionality to be performed before the user-supplied code module called by the step is executed. Thus, the test executive engine may execute the pre-functionality of the step.

The test executive engine may allocate a memory block from a heap for the buffer parameter for the user-supplied code module. The allocated memory block may include space for storing data for the buffer parameter and space for storing guard bits for the buffer parameter. The test executive engine may copy guard bits into at least one end of the memory block, i.e., may copy guard bits into the space for storing guard bits for the buffer parameter. Each guard bit may be initialized or set to an initial value. The purpose of the guard bits is described below.

In one embodiment guard bits may be copied into both ends of the memory block. In another embodiment guard bits may be copied into only one end of the memory block. In various embodiments any number of guard bits may be copied into either end of the memory block, and any desired fill pattern or bit sequence may be used to set the guard bits to their initial values.

The test executive engine may then invoke execution of the user-supplied code module called by the step. The test executive engine may pass the user-supplied code module a reference to the buffer parameter. For example, in one embodiment the user-supplied code module may be passed a pointer into the memory block allocated for the buffer parameter, where the pointer points to the space for storing data for the buffer parameter.

The user-supplied code module called by the test executive step may execute to perform any functionality and may utilize the buffer parameter in any of various ways. In one embodiment the user-supplied code module may execute to write data into the buffer parameter, e.g., into the space for storing data for the buffer parameter. In normal operation, the user-supplied code module called by the step should not write into memory locations before the starting end of the space for storing data for the buffer parameter or memory locations beyond the terminal end of the space for storing data for the buffer parameter.

In one embodiment, the test executive engine may check each guard bit in the memory block after the user-supplied code module called by the step finishes executing to determine whether the guard bit is still set to its initial value. This may enable the test executive engine to determine whether the user-supplied code module wrote outside the bounds of the space for storing data for the buffer parameter.

If the test executive engine determines that any guard bit in the memory block has changed from its initial value, i.e., determines that the user-supplied code module wrote outside the bounds of the space for storing data for the buffer parameter, then the test executive engine may be operable to report an error in response. In one embodiment the test executive engine may stop execution of the test executive sequence and may display information on the display of the host computer indicating that the user-supplied code module wrote outside the bounds of the buffer parameter and may have corrupted or overwritten data on the heap. In another embodiment the test executive engine may continue executing the test executive sequence but may log the error, e.g., may log the error in a test results report for the test executive sequence, in a file, or in a database, etc.

In an alternative embodiment the test executive engine may not check each guard bit in the memory block after the user-supplied code module called by the step finishes executing. For example, the guard bits in the memory block may prevent the user-supplied code module from corrupting heap data (in some cases) in the event that the user-supplied code module writes outside the bounds of the space for storing data for the buffer parameter, but the test executive engine may not check to see whether an overwrite occurred.

In one embodiment the step may have "post-functionality" that is implemented by the test executive engine, i.e., functionality to be performed after the user-supplied code module called by the step is executed. Thus, the test executive engine may execute the post-functionality of the step.

BRIEF DESCRIPTION OF THE DRAWINGS

A better understanding of the present invention can be obtained when the following detailed description of the preferred embodiment is considered in conjunction with the following drawings, in which:

FIG. 4 illustrates one example of a test executive sequence, created according to one embodiment of a sequence editor;

Figure 1:
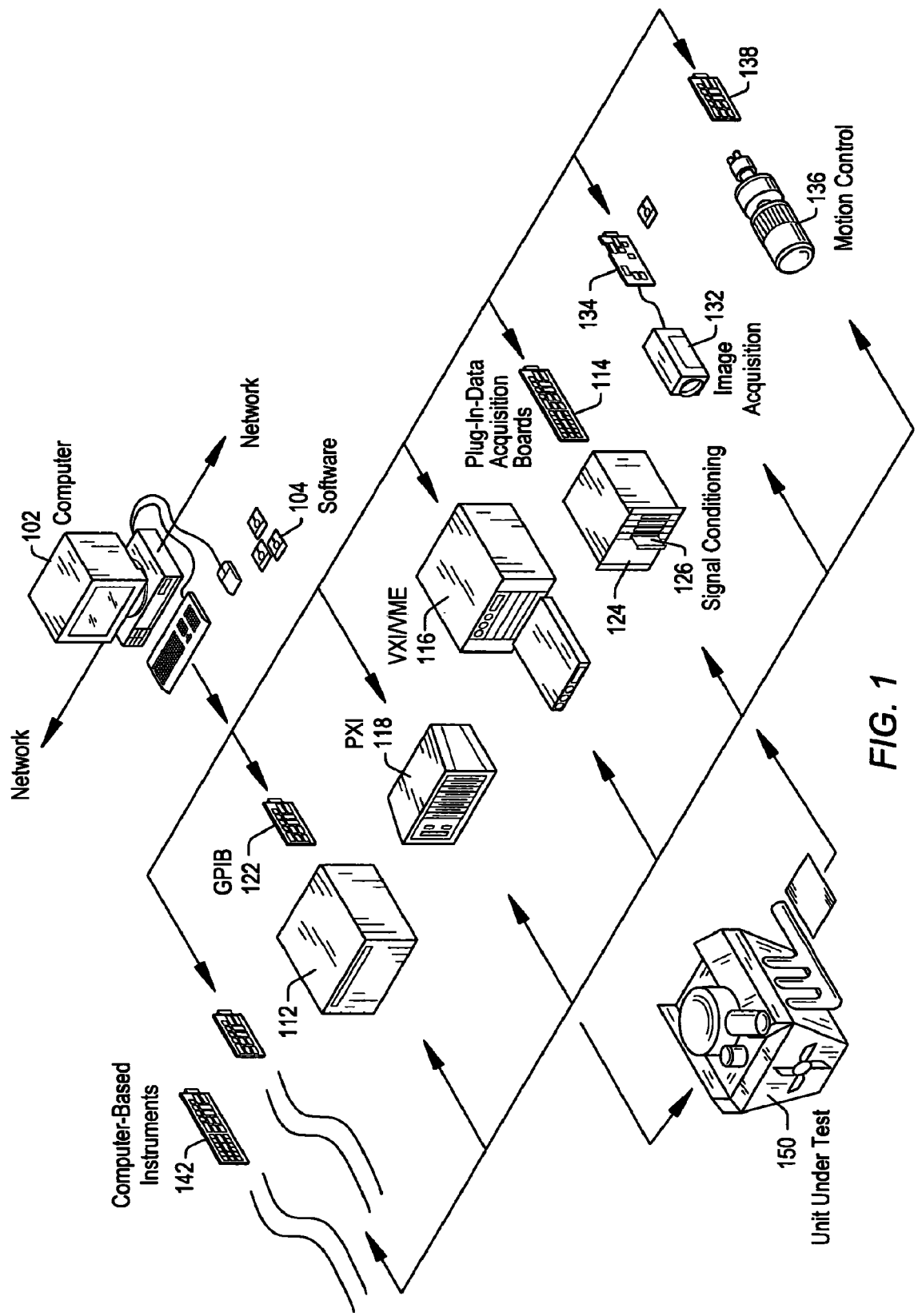
FIG. 1 illustrates an exemplary automated test system according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

The following references are hereby incorporated by reference in their entirety as though fully and completely set forth herein.

U.S. Pat. No. 6,401,220 titled "Test Executive System and Method Including Step Types for Improved Configurability," issued Jun. 4, 2002.

U.S. patent application Ser. No. 09/944,546 titled "System and Method Enabling Execution Stop and Restart of a Test Executive Sequence(s)," filed Aug. 31, 2001.

U.S. patent application Ser. No. 10/056,853 titled "Test Executive System Having XML Reporting Capabilities," filed Jan. 25, 2002.

Terms

The following is a glossary of terms used in the present application:

User-Supplied Code Module—A software module or component written by a user. A user-supplied code module may be constructed or packaged in any of various ways and may be created using any of various programming tools or application development environments. For example, a user-supplied code module may be implemented as a function in a Windows Dynamic Link Library (DLL), a LabVIEW graphical program (VI), an ActiveX component, a Java component, or other type of program module or component that implements a specific test or other functionality.

Test Module—A user-supplied code module that performs a test of a UUT.

Test Executive Step—An action that the user can include within a test executive sequence. A step may call a user-supplied code module, e.g., may call a test module to perform a specific test of a UUT. The step may have properties or parameters that can be set by the user, e.g., through a dialog box or other graphical user interface. In addition to calling a user-supplied code module, a step may also have built-in functionality implemented by the test executive software.

Step Module—The user-supplied code module that a test executive step calls.

Test Executive Sequence—A plurality of test executive steps that the user specifies for execution in a particular order. Whether and when a step is executed can depend on the results of previous steps. A test executive sequence may be created using a sequence editor. For example, the sequence editor may create a sequence file or other data structure representing the test executive sequence. A test executive sequence may be executed by a test executive engine.

Sequence File—A file that contains the definition of one or more test executive sequences.

Sequence Editor—A program that provides a graphical user interface for creating, editing, and debugging sequences. One embodiment of a sequence editor is described in detail below.

Test Executive Engine—A program operable to execute a test executive sequence. One embodiment of a test executive engine is described in detail below.

Run-time Operator Interface Application—An application program that provides a graphical user interface for controlling execution of test executive sequences, e.g., on a production station. For example, the graphical user interface of the run-time operator interface application may allow a test operator to start and stop execution of the test executive sequences. A sequence editor and run-time operator interface application can be separate programs or different aspects of the same program. The test executive engine may provide an application programming interface (API) which the run-time operator interface application calls to control execution of the test executive sequences.

Application Development Environment (ADE)—A programming environment such as LabVIEW, LabWindows/CVI, Microsoft Visual C++, Microsoft Visual Basic, etc., in which a user can create user-supplied code modules and run-time operator interface applications.

Unit Under Test (UUT)—A physical device or component that is being tested.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "graphical user interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window, panel, or dialog box having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output. Exemplary graphical user interface elements include input controls and output indicators Input Control—a graphical user interface element for providing user input to a program. Exemplary input controls include buttons, check boxes, input text boxes, knobs, sliders, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data from a UUT. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1—Instrumentation System

FIG. 1 illustrates an exemplary automated test system 100, according to one embodiment. It is noted that FIG. 1 is exemplary only, and the present invention may be used in conjunction with any of various systems, as desired. The system 100 comprises a host computer 102 that connects to one or more instruments. The host computer 102 comprises a CPU, a display screen, memory, and one or more input devices such as a mouse or keyboard as shown.

The computer 102 may execute a test executive sequence operable to analyze, measure, control, or otherwise test a unit under test (UUT) or process 150. For example, the test executive sequence may include various steps that invoke software test modules operable to connect through the one or more instruments to analyze, measure, or control the unit under test (UUT) or process 150. The software test modules that are invoked or called by the steps in the test executive sequence may comprise user-supplied code modules. In other words, the test modules may be written or supplied by a user of the test executive software.

The test executive software may include a test executive engine 220 operable to execute the test executive sequence. As described above, errors in user-supplied code modules that are called by steps in the test executive sequence may cause the test executive sequence to crash when it is executed or to exhibit other problematic behavior. One common type of problem is caused by a user-supplied code module writing outside the bounds of a buffer that has been allocated on the heap. As used herein, the term "buffer" may refer to a portion of contiguous memory. A buffer may have a buffer size, e.g., a number of bytes. Buffers are often used to store data types such as strings.

As described above, if a user-supplied code module called by a step in the test executive sequence erroneously writes outside the bounds of a buffer that has been allocated on a heap, i.e., either erroneously writes into memory locations before the first byte in the buffer or erroneously writes into memory locations beyond the last byte in the buffer, then other data on the heap may be overwritten. For example, in one embodiment the buffer may be located in a heap from which the test executive engine 220 also allocates memory blocks for its own use, and the user-supplied code module may overwrite or corrupt heap data in memory blocks allocated for use by the test executive engine 220. The user-supplied code module may also overwrite or corrupt control information for the heap or heap data in memory blocks allocated by other user-supplied code modules called by other steps in the test executive sequence.

User-supplied code modules called by steps of a test executive sequence sometimes take buffers as parameters. When a user-supplied code module takes a buffer as a parameter, the user-supplied code module may be passed a pointer to the buffer, where the pointer points to a starting memory location for the buffer, e.g., points to the first byte in the buffer. For example, the test executive engine 220 may allocate a memory block for the buffer from a heap and may pass the user-supplied code module a pointer to the memory block when the test executive engine 220 invokes the user-supplied code module for execution during execution of the test executive sequence. In one embodiment the test executive software, e.g., the test executive engine 220, may be operable to utilize guard bytes for the buffer parameter to automatically detect a situation where the user-supplied code module writes outside the bounds of the buffer parameter and/or to prevent the user-supplied code module from corrupting heap data if the user-supplied code module writes outside the bounds of the buffer parameter, as described in detail below with reference to FIG. 6.

Referring again to FIG. 1, the one or more instruments of the automated test system 100 may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via a GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and optionally interfaces through signal conditioning circuitry 124 to the UUT. The signal conditioning circuitry 124 may include an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 may be coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical systems an instrument will not be present of each interface type, and in fact many systems may only have one or more instruments of a single interface type, such as only GPIB instruments.

The instruments may be coupled to the unit under test (UUT) or process 150, or may be coupled to receive field signals, typically generated by transducers. Other types of instruments or devices may be connected to the automated test system 100, as desired.

The computer 102 may include or may access a memory medium on which test executive software is stored. For example, the test executive software may include a test executive engine 220 which is operable to execute test executive sequences. The test executive software may also include components operable to create and configure test executive sequences, as described below. For example, the memory medium may store a sequence editor 212 such as described below. In one embodiment the memory medium may also store one or more test executive sequences to be executed on the computer 102, as well as possibly storing one or more user-supplied code modules called by steps in the test executive sequences. In one embodiment, one or more of the software elements described above may be included on remote computer systems.

Figure 2:
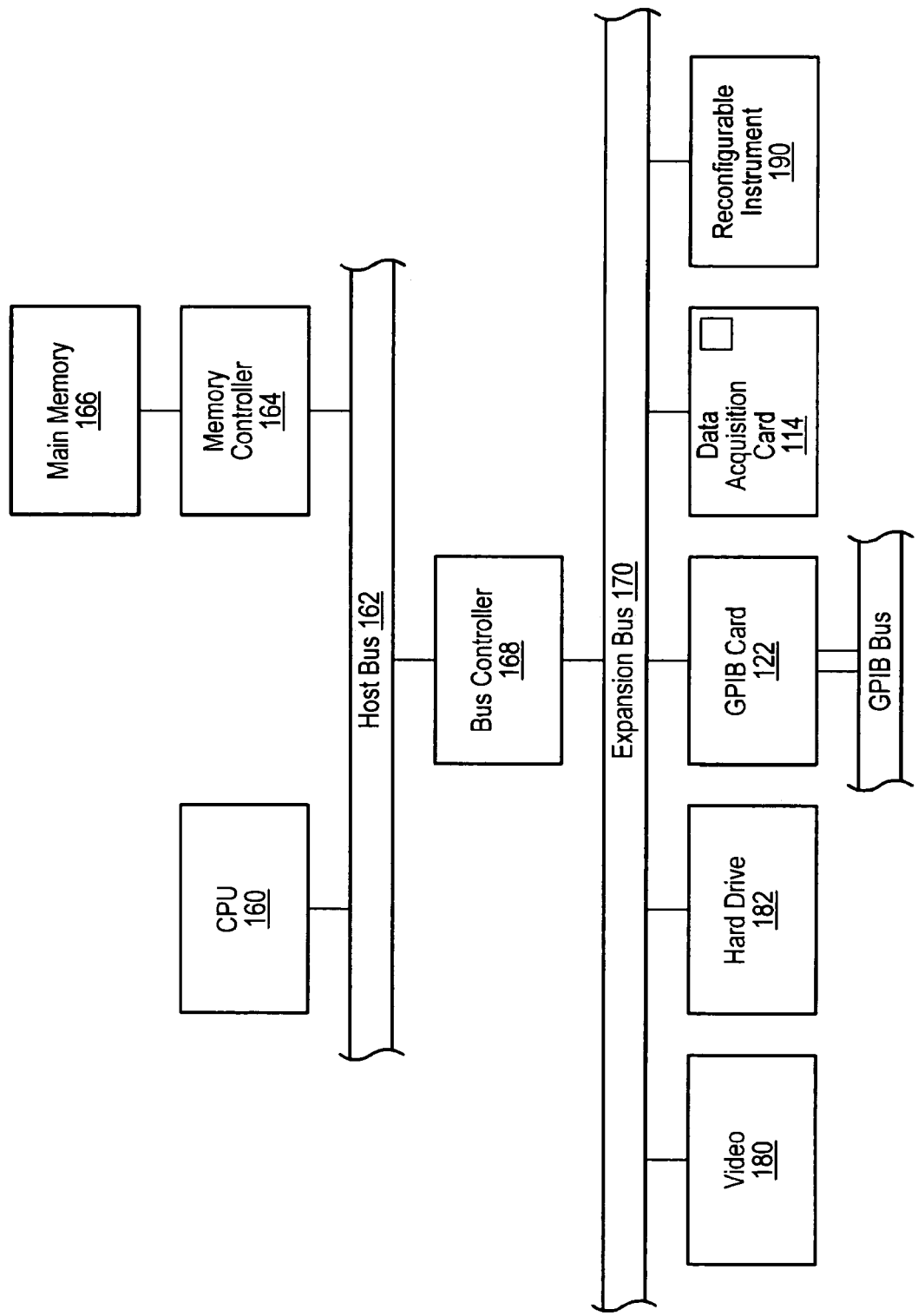
FIG. 2 is a diagram representing one embodiment of the computer system illustrated in FIG. 1.

FIG. 2—Computer System Block Diagram

FIG. 2 is a diagram of the computer system 102 illustrated in FIG. 1, according to one embodiment. It is noted that any type of computer system configuration or architecture can be used as desired, and FIG. 2 illustrates a representative PC embodiment. It is also noted that the computer system 102 may be a general purpose computer system, a computer implemented on a VXI card installed in a VXI chassis, a computer implemented on a PXI card installed in a PXI chassis, or other types of embodiments. Elements of a computer not necessary to understand the present invention have been omitted for simplicity.

In the illustrated embodiment, the computer 102 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store software such as the software elements described above with reference to FIG. 1. The main memory 166 may also store operating system software as well as other software for operation of the computer system, as well known to those skilled in the art. The CPU 160 executing code and data from the main memory 166 may comprise a means for implementing the methods described below.

The host bus 162 is coupled to an expansion or input/output bus 170 by means of a bus controller 168 or bus bridge logic. The expansion bus 170 may be the PCI (Peripheral Component Interconnect) expansion bus, although other bus types can also be used. The expansion bus 170 may include slots for various devices such as the data acquisition board 114 (of FIG. 1) and a GPIB interface card 122 that provides a GPIB bus interface to the GPIB instrument 112 (of FIG. 1). A video display subsystem 180 and hard drive 182 coupled to the expansion bus 170 is also shown.

In one embodiment, a reconfigurable instrument 190 may also be connected to the computer 102. The reconfigurable instrument 190 may include a functional unit, also referred to as configurable logic, such as a programmable logic element, e.g., an FPGA, or a processor and memory, which may execute a real time operating system. Program instructions may be downloaded and executed on the reconfigurable instrument 190. In one embodiment, at least a portion of the software described herein may execute on the reconfigurable instrument 190. In various embodiments, the functional unit may be included on an instrument or device connected to the computer through means other than an expansion slot, e.g., the instrument or device may be connected via an IEEE 1394 bus, USB, or other type of port. Also, the functional unit may be included on a device such as the data acquisition board 114 or another device shown in FIG. 1.

Test Executive Software Components

Figure 3:
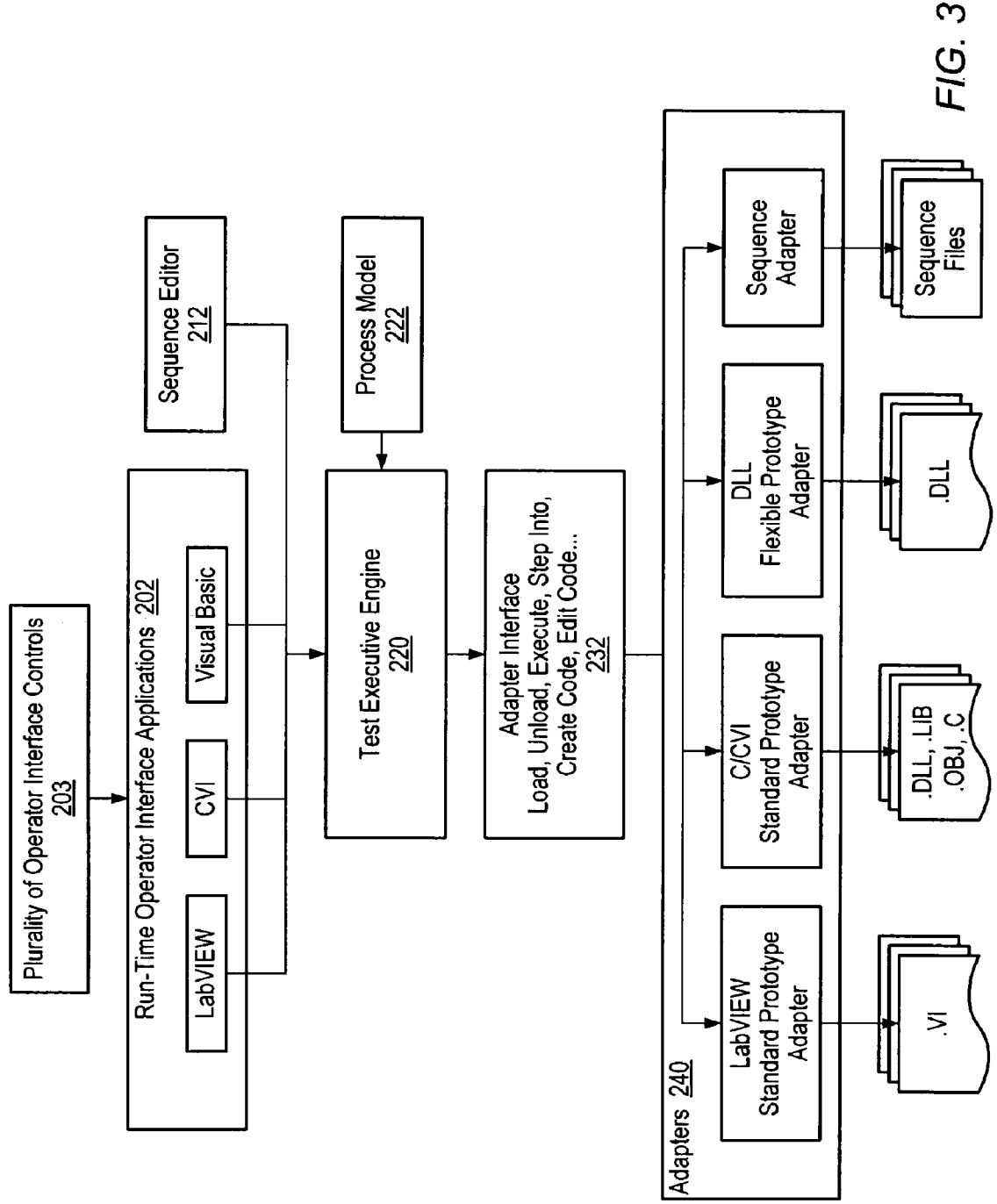
FIG. 3 is a diagram illustrating high-level architectural relationships between elements of a test executive software application according to one embodiment.

FIG. 3 is a block diagram illustrating high-level architectural relationships between elements of a test executive software application according to one embodiment. It is noted that FIG. 3 is exemplary, and in other embodiments the test executive software may have different architectures.

In the embodiment illustrated in FIG. 3, the test executive software includes a sequence editor 212 for creating and editing test executive sequences. The sequence editor 212 may interface to a test executive engine 220. In one embodiment, one or more process models 222 may couple to the test executive engine 220. The test executive engine 220 may interface through an adapter interface 232 to one or more adapters 240. The adapters 240 shown in FIG. 3 include a LabVIEW standard prototype adapter, a C/CVI prototype adapter, a DLL flexible prototype adapter, and a sequence adapter. The LabVIEW standard prototype adapter may interface to user-supplied code modules having a VI extension, i.e., LabVIEW graphical programs. The C/CVI prototype adapter may interface to user-supplied code modules having a .dll, .lib, .obj, or .c extension. The DLL flexible prototype adapter may interface to user-supplied code modules having a .dll extension. The sequence adapter may interface to sequence files.

The test executive engine 220 may manage the execution of test executive sequences. Test executive sequences include test executive steps that may call external or user-supplied code modules. By using module adapters 240 that have the standard adapter interface 232, the test executive engine 220 may invoke execution of different types of user-supplied code modules. Thus, the test executive may be independent from particular application development environments (ADEs) used to create the user-supplied code modules. In one embodiment, the test executive may use a special type of sequence called a process model to direct the high-level sequence flow. The test executive engine 220 may implement an application programming interface (API) used by the sequence editor 212 and run-time operator interfaces 202.

Sequence Editor

The sequence editor 212 may comprise a program in which the user creates, edits, and/or debugs test executive sequences. The sequence editor 212 may have a graphical user interface (GUI) enabling a user to efficiently create a test executive sequence for testing a physical system or unit under test. The graphical user interface of the sequence editor 212 may enable the user to request or select steps to be added to a test executive sequence and configure the steps. The graphical user interface may provide the user with easy access to test executive features, such as step types, step properties, sequence parameters, step result collection, etc.

FIG. 4 illustrates one example of a test executive sequence, created according to one embodiment of a sequence editor 212. The exemplary test executive sequence of FIG. 4 includes a plurality of test executive steps that call user-supplied code modules operable to test various aspects of a computer system under test. For example, the sequence includes a "ROM" step that calls a user-supplied code module to test the computer's read-only memory, a "RAM" step that calls a user-supplied code module to test the computer's random access memory, etc. Each user-supplied code module called by a step in the test executive sequence may interact with one or more hardware devices or instruments that interface with the computer system under test to perform the desired test.

Figure 5:
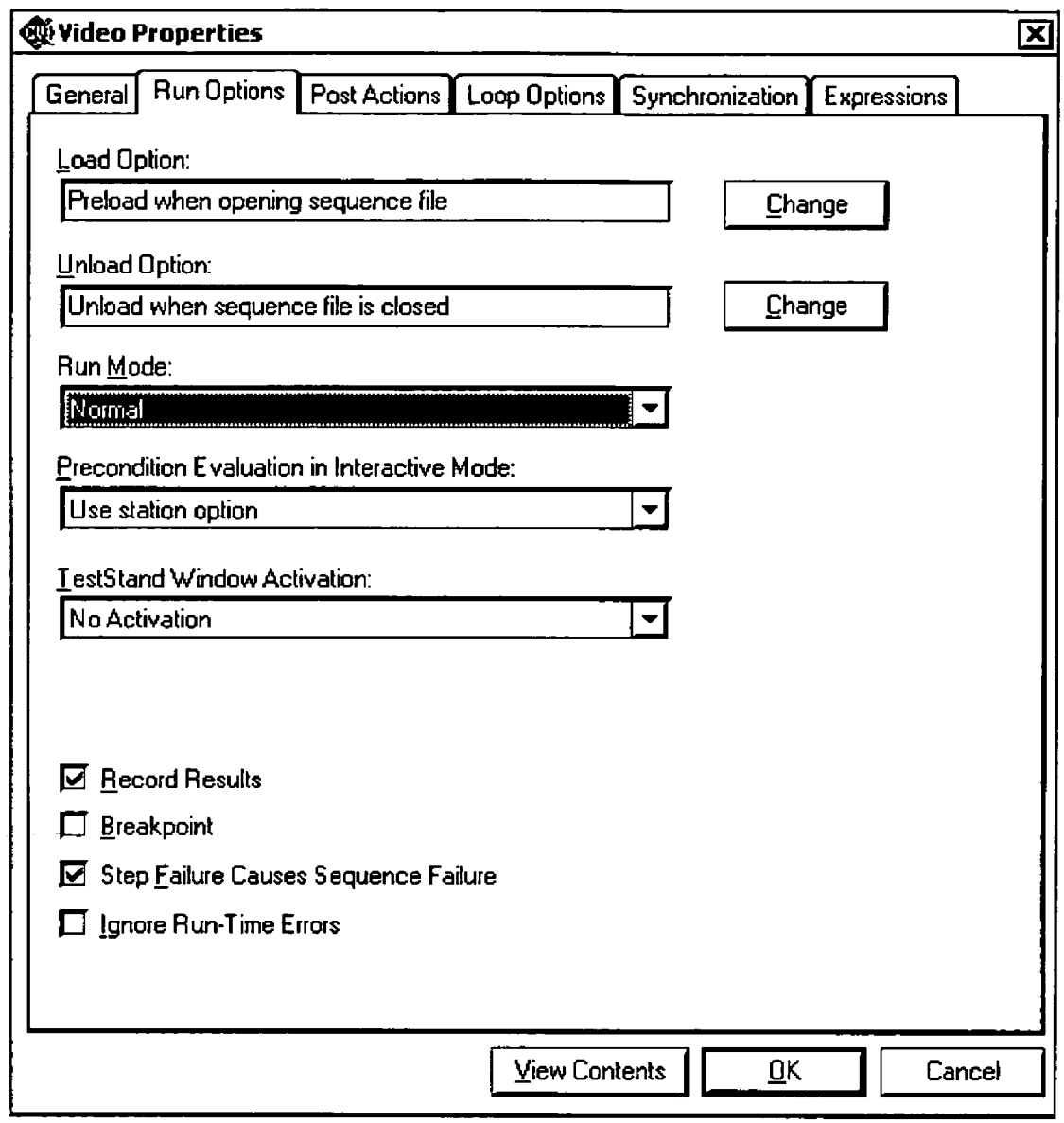
FIG. 5 illustrates an exemplary GUI panel for a test executive step, which enables the user to specify various properties for the step that affect the way the test executive engine manages the execution of the step.

The user may be able to set-various properties or parameters for each step that affect the way the test executive engine 220 manages the execution of the step. For example, the sequence editor 212 may provide a dialog box or other graphical user interface for each step with which the user may interact to specify the properties or parameters for the step. For example, FIG. 5 illustrates an exemplary dialog box for the "Video" step of the test executive sequence of FIG. 4. As shown, a "Run Options" property page is selected in FIG. 5. The "Run Options" property page enables the user to specify various options for the step, such as whether to collect test results for the step, whether to break execution when the step is reached, whether to pre-load the step when opening the sequence file, etc. Other property pages in the dialog box of FIG. 5, such as the "General", "Post Actions", "Loop Options", "Synchronization", and "Expressions" pages, enable the user to specify other options or properties for the step. For example, the user may provide input to the "General" page to specify a user-supplied code module for the step to call, e.g., by selecting a file (and possibly a module or function within the file) representing the user-supplied code module.

As described in detail below, in one embodiment the test executive engine 220 may be operable to automatically detect a situation where a user-supplied code module called by a step in a test executive sequence writes outside the bounds of a buffer parameter and/or may be operable to prevent the user-supplied code module from corrupting heap data if the user-supplied code module writes outside the bounds of the buffer parameter, as described in detail below with reference to FIG. 6. In one embodiment the sequence editor 212 may provide a graphical user interface for setting various properties related to buffer parameter overwrite detection/prevention for user-supplied code modules. The sequence editor 212 may allow the user to specify global options related to buffer parameter overwrite detection/prevention for the entire sequence (such as whether buffer parameter overwrite detection/prevention is enabled or disabled for the sequence) as well as specify options related to buffer parameter overwrite detection/prevention for individual steps in the sequence (such as whether buffer parameter overwrite detection/prevention is enabled or disabled for the user-supplied code module called by the individual step).

In one embodiment, the sequence editor 212 may also include an execution window that provides debugging tools for debugging test executive sequences. For example, the test executive application may provide debugging features such as breakpoints, single stepping, tracing, a variable display, and a watch window.

Test Executive Engine

The test executive engine 220 may be used when executing and debugging test executive sequences. The test executive engine 220 may also provide a test executive engine application programming interface (API) that enables another program to interface with the test executive engine 220 in order to perform these actions. For example, a run-time operator interface application may request the test executive engine 220 to execute a test executive sequence, stop execution of the test executive sequence, etc.

In one embodiment, the test executive engine 220 may export an object-based or component-based API, which in one embodiment may be an ActiveX Automation API. The sequence editor 212 and run-time operator interface applications 202 may call the test executive engine API. The engine API may be called from any programming environment able to use the API. For example, where the API comprises an ActiveX Automation API, the engine API may be called from any programming environment that supports access to ActiveX Automation servers. Thus, in various embodiments, the engine API may be called from run-time operator interface applications 202 or test modules written in various programming environments, including those that are written in LabVIEW, LabWindows/CVI, Microsoft Visual C++, Microsoft Visual Basic, Java, etc.

One task performed by the test executive engine 220 is to manage the execution of test executive sequences. Executing a test executive sequence may comprise executing steps included in the test executive sequence. Not all steps in the test executive sequence are necessarily executed. For example, the user may configure some steps to be skipped, e.g., depending on execution results of previous steps.

For a step that calls a user-supplied code module, executing the step may comprise invoking execution of the respective code module. As described above, the user-supplied code module may be constructed in various ways, using any of various kinds of programming languages or application development environments. The user-supplied code module may execute independently from the test executive engine 220 and may possibly be executed under control of its own execution environment or subsystem.

In addition to these user-supplied code modules being executed, for each step, additional program instructions may be executed, wherein these additional program instructions are implemented by the test executive engine 220 itself and provide additional functionality for the step. In other words, these additional program instructions may be program instructions of the test executive software, e.g., program instructions of the test executive engine 220, rather than being defined by the user. As one example, when including a step in a test executive sequence, the user may configure execution results of the step to be collected. In this example, when the step is executed, test executive engine 220 program instructions operable to store the step results accordingly may be executed in addition to the program instructions of a user-supplied code module that the step references.

In some instances, the additional program instructions that are implemented by the test executive engine 220 may be executed before a user-supplied code module called by the step is invoked. In this case, the functionality that is performed before the user-supplied code module is invoked may be referred to as "pre-functionality". In other instances, the additional program instructions that are implemented by the test executive engine 220 may be executed after the user-supplied code module called by the step finishes execution. In this case, the functionality that is performed after the user-supplied code module finishes execution may be referred to as "post-functionality". A step may have pre-functionality and/or post-functionality, or neither. The term "control functionality" may be used to collectively refer to the pre-functionality and post-functionality of a step.

It is noted that in one embodiment, not all steps of a test executive sequence must call a user-supplied code module. For example, the test executive software may provide some step types that primarily affect various aspects of sequence execution and are not designed to call user-supplied code modules.

As a test executive sequence is executed, various results may be generated. In one embodiment the test executive engine 220 may be operable to automatically collect the results, e.g., may store the results in one or more data structures. In various embodiments, the results may be generated or structured in any of various ways. For example, in one embodiment, there may be one or more results for the unit under test (UUT) as a whole, as well as results for individual steps in the sequence. The results may vary in data type as well.

Test Executive Steps

As described above, a test executive sequence comprises and defines an ordering for a plurality of test executive steps. A test executive step can do many things, such as initializing an instrument, performing a complex test, or making a decision that affects the flow of execution in a test executive sequence. Steps may perform these actions through several types of mechanisms, including jumping to another step, executing an expression, calling a sub-sequence, or calling a user-supplied code module.

Steps may have custom properties which the user can set, e.g., by interacting with a dialog box or other graphical user interface for the step as described above. For steps that call user-supplied code modules, custom step properties may be useful for storing parameters to pass to the user-supplied code module for the step. They may also serve as locations for the user-supplied code module to store its results. The test executive API may be used to access the values of custom step properties from user-supplied code modules.

As described above, in one embodiment not all steps call user-supplied code modules. Some steps may perform standard actions that the user configures using a GUI panel or dialog box. In this case, custom step properties may be useful for storing configuration settings that the user specifies.

Built-In Step Properties

As discussed above, in one embodiment test executive steps in a test executive sequence may have a number of built-in properties or parameters that the user can specify or configure. In one embodiment, built-in step properties may include properties such as:

"Preconditions" that allow the user to specify the conditions that must be true for the test executive engine 220 to execute the step during the normal flow of execution in a sequence.

"Load/Unload Options" that allow the user to specify when the test executive software loads and unloads the code modules or subsequences that each step invokes.

"Run Mode" that allows a step to be skipped or forced to pass or fail without executing the step module.

"Record Results" that allows the user to specify whether the test executive software collects the results of the step.

"Step Failure Causes Sequence Failure" that allows the user to specify whether the test executive software sets the status of the test executive sequence to "Failed" when the status of the step is "Failed".

"Ignore Run-Time Errors" that allows the user to specify whether the test executive sequence continues execution normally after the step even though a run-time error occurs in the step.

"Post Actions" that allows the user to specify the execution of callbacks or jump to other steps after executing the step, depending on the pass/fail status of the step or any custom condition.

"Loop" options that cause a single step to execute multiple times before executing the next step. The user can specify the conditions under which to terminate the loop. The user can also specify whether to collect results for each loop iteration, for the loop as a whole, or for both.

"Pre Expression" that allows the user to specify an expression to be evaluated before executing the step module.

"Post Expression" that allows the user to specify an expression to be evaluated after executing the step module.

"Status Expression" that allows the user to specify an expression to use to set the value of a "status" property of the step automatically.

Figure 6:
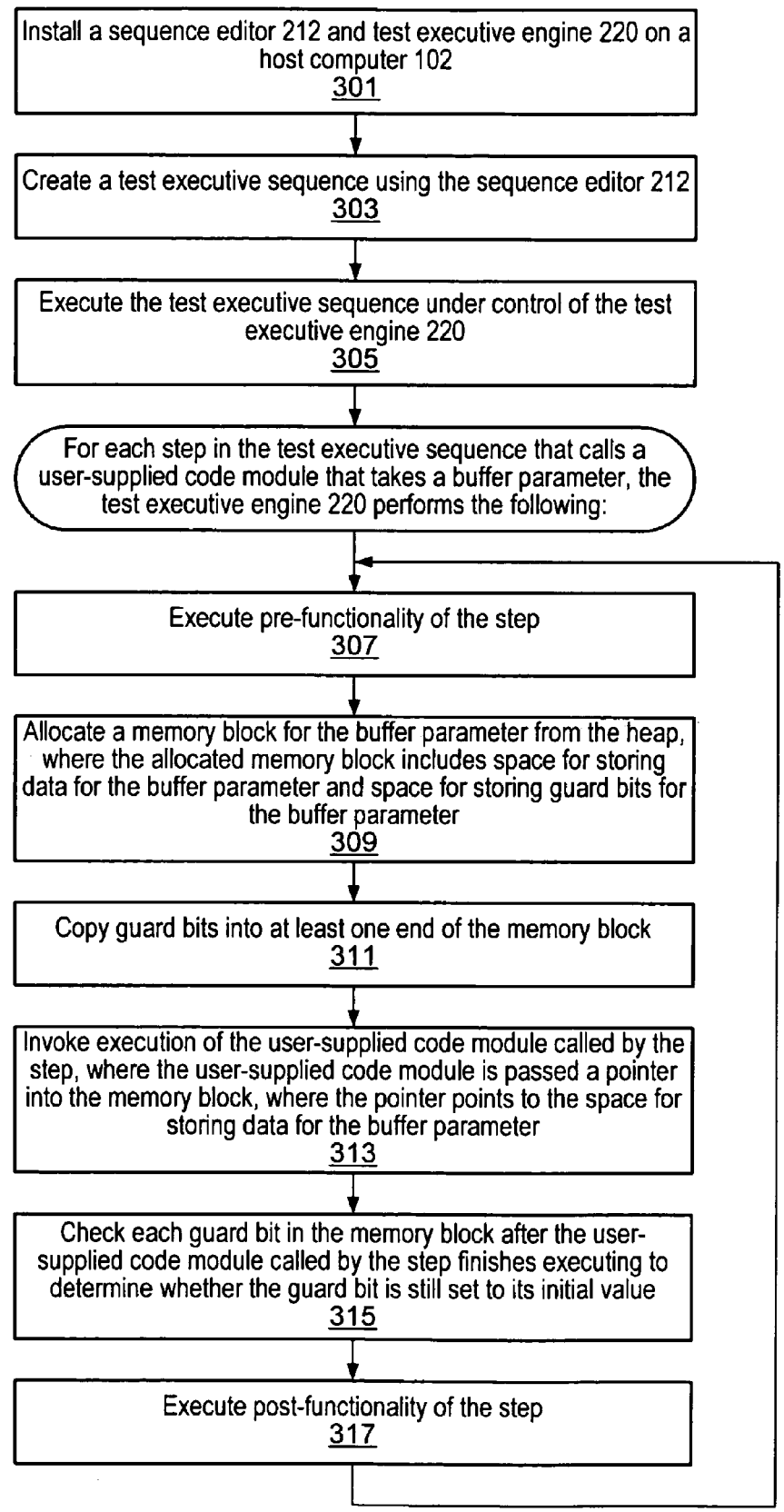
FIG. 6 is a flowchart diagram illustrating one embodiment of a method for utilizing guard bits to automatically detect a situation where a user-supplied code module writes outside the bounds of a buffer parameter and/or to prevent the user-supplied code module from corrupting heap data if the user-supplied code module writes outside the bounds of the buffer parameter.

FIG. 6—Automatically Detecting and/or Preventing Buffer Parameter Overwriting

As discussed above, user-supplied code modules called by steps of a test executive sequence sometimes contain bugs that cause them to erroneously write outside the bounds of a buffer received from the test executive engine 220 as a parameter. The buffer parameter may have been allocated from a heap, and writing outside the bounds of the buffer parameter may cause other data on the heap to be corrupted (overwritten). FIG. 6 is a flowchart diagram illustrating one embodiment of a method for utilizing guard bits for the buffer parameter to automatically detect a situation where the user-supplied code module writes outside the bounds of the buffer parameter and/or to prevent the user-supplied code module from corrupting heap data if the user-supplied code module writes outside the bounds of the buffer parameter. It is noted that FIG. 6 illustrates a representative embodiment, and alternative embodiments are contemplated. Also, various elements may be combined, omitted, or performed in different orders.

In 301, a test executive application may be installed on a computer system, such as the host computer 102 described above. As used herein, installing the test executive application on a computer system may include enabling the computer system to execute the test executive application. For example, one or more executable files associated with the test executive application or providing access to the test executive application may be installed on the host computer 102. The test executive application may include a sequence editor 212 and a test executive engine 220, as described above.

In 303, a test executive sequence may be created using the test executive application installed in 301. For example, the test executive sequence may be created using the sequence editor 212 of the test executive application, as described above. Creating the test executive sequence may comprise including a plurality of test executive steps in the test executive sequence in response to user input to the sequence editor 212, as described above. The user may also configure each of the steps, e.g., by interacting with a GUI panel or dialog box for each step to set various properties.

As described above, at least a subset of the steps in the test executive sequence may be configured to call user-supplied code modules. For example, for each step that calls a user-supplied code module, the user may interact with a GUI panel to specify or select the user-supplied code module to call. Each of the user-supplied code modules called by steps of the test executive sequence may take parameters of various data types. In particular, one or more of the user-supplied code modules may take one or more buffers as parameters. For example, as described above, when a user-supplied code module that takes a buffer parameter is invoked for execution, a buffer may be allocated from a heap, and the user-supplied code module may be passed a pointer to the buffer on the heap.

In various embodiments the test executive sequence may be operable to test any of various kinds of units under test (UUT) or physical systems. For example, steps in the test executive sequence may call user-supplied code modules that are operable to connect through one or more hardware devices or instruments to analyze, measure, or control a unit under test (UUT) or process 150, such as described above with reference to FIG. 1.

In 305, the test executive sequence may be executed under control of the test executive application, e.g., under control of the test executive engine 220 supplied by the test executive application. Executing the test executive sequence may comprise executing each of the steps in the test executive sequence. In various embodiments the test executive sequence may be executed to perform any of various kinds of tests on a unit under test (UUT) or process 150. For example, as described above with reference to FIG. 1, the host computer 102 may couple to one or more instruments, and various test executive steps in the test executive sequence may call user-supplied code modules that are operable to connect through the one or more instruments to analyze, measure, or control the unit under test (UUT) or process 150.

FIG. 6 indicates several operations that the test executive engine 220 may perform when executing each step in the test executive sequence that calls a user-supplied code module that takes a buffer parameter. As described above, in one embodiment the step may have "pre-functionality" that is implemented by the test executive engine 220, i.e., functionality to be performed before a user-supplied code module called by the step is executed. In 307 the test executive engine 220 may execute the pre-functionality of the step. In another embodiment the step may not have pre-functionality, and 307 may not be performed.

In 309 the test executive engine 220 may allocate a memory block 400 for the buffer parameter from a heap. The allocated memory block 400 may include space 403 for storing data for the buffer parameter and space 404 for storing guard bits for the buffer parameter.

As described above, the buffer parameter may have a buffer size, e.g., a number of bytes, which is typically the maximum number of bytes of data that the buffer parameter is expected to hold. For example, the user may interact with a graphical user interface of the sequence editor 212 when creating the test executive sequence to specify the buffer size for the buffer parameter, or the user may specify a prototype for the user-supplied code module called by the step, where the prototype specifies the buffer size for the buffer parameter. In the memory block 400, the size of the space 403 for storing data for the buffer parameter may be the same as the buffer size.

In 311 the test executive engine 220 may copy bits referred to herein as "guard bits" into at least one end of the memory block 400, i.e., may copy guard bits into the space 404 for storing guard bits for the buffer parameter. Each guard bit may be initialized or set to an initial value. The purpose of the guard bits is described below.

In one embodiment guard bits may be copied into both ends of the memory block 400. In another embodiment guard bits may be copied into only one end of the memory block 400. In various embodiments any number of guard bits may be copied into either end of the memory block 400, and any desired fill pattern or bit sequence may be used to set the guard bits to their initial values. In one embodiment the number of guard bits utilized either end of the memory block 400 may be a multiple of the number of bits in a byte. In other words, one or more bytes at either end of the memory block 400 may be dedicated to storing the guard bits. These bytes may also be referred to as "guard bytes".

Thus, allocating the memory block 400 in 309 may comprise determining an appropriate size for the memory block 400, which depends on the size of the space 403 for storing data for the buffer parameter (i.e., the buffer size) and the size of the space 404 for storing guard bits for the buffer parameter. The size of the space 404 for storing guard bits for the buffer parameter depends on the number of guard bits that are used in a particular embodiment and depends on whether the guard bits are copied into one or both ends of the memory block 400.

Figure 7:
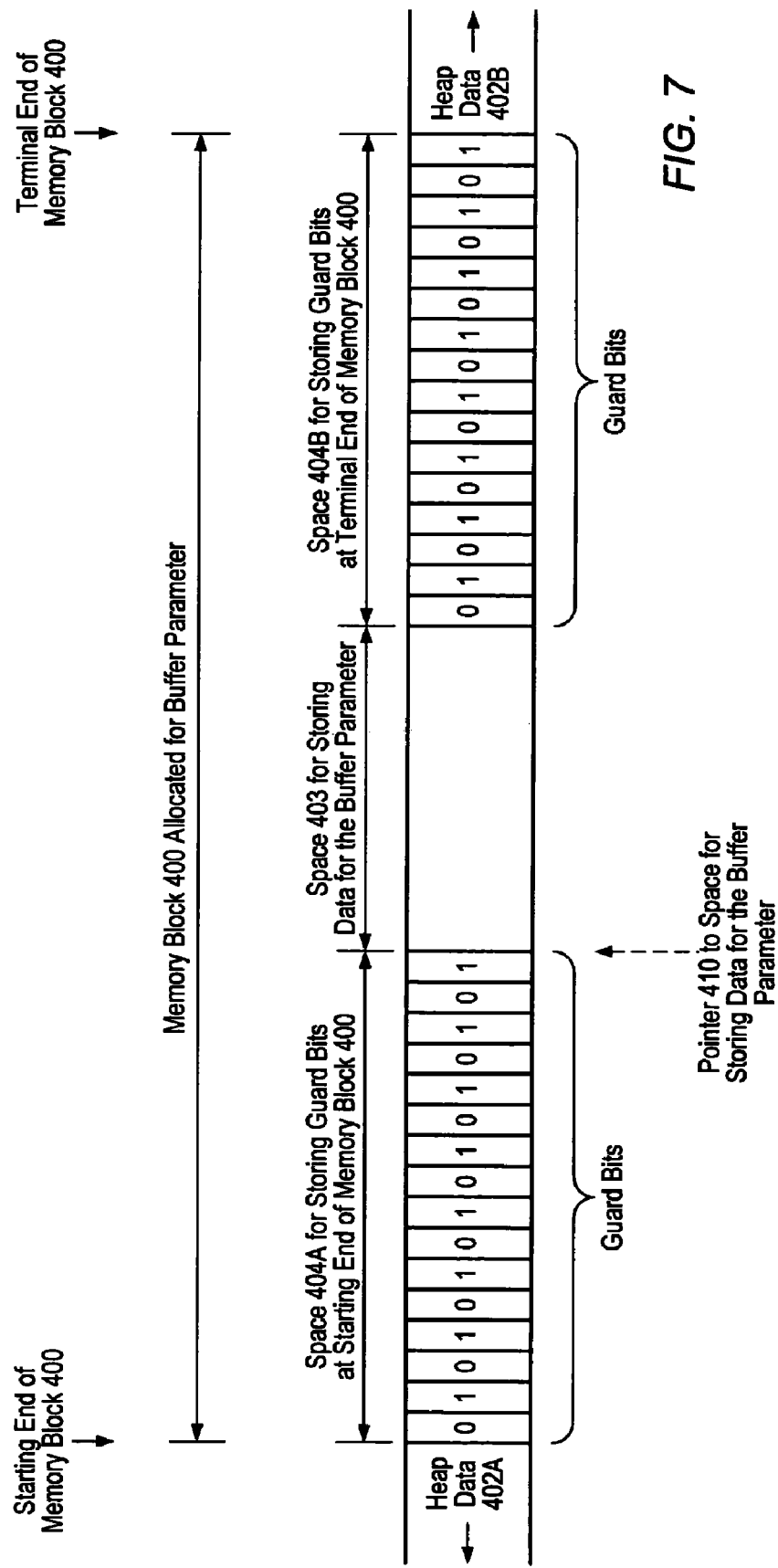
FIGS. 7-9 illustrate several exemplary embodiments of a portion of a heap showing a memory block allocated for a buffer parameter, where the allocated memory block includes space for storing data for the buffer parameter and space for storing guard bits for the buffer parameter.
Figure 8:
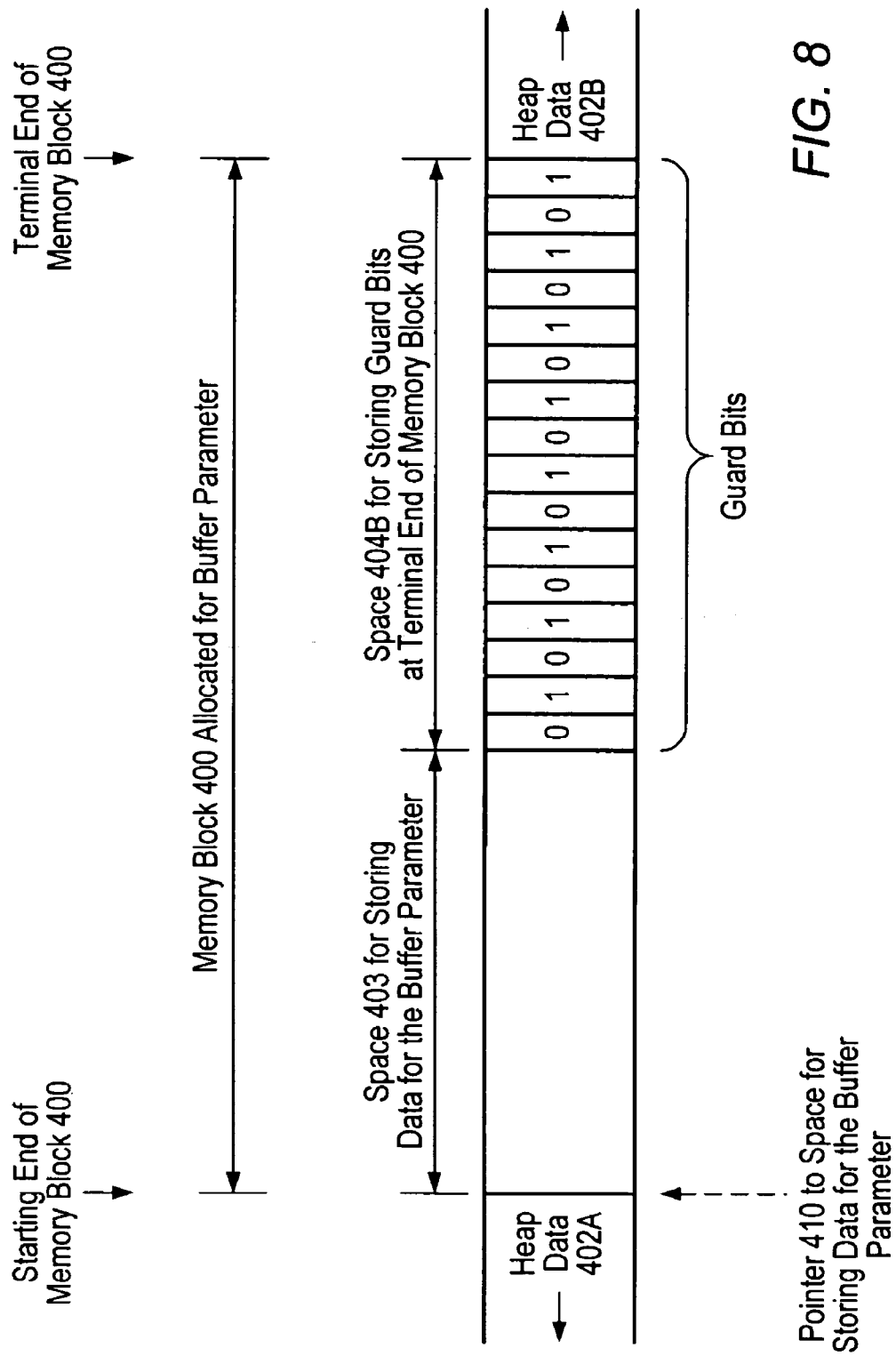
Figure 9:
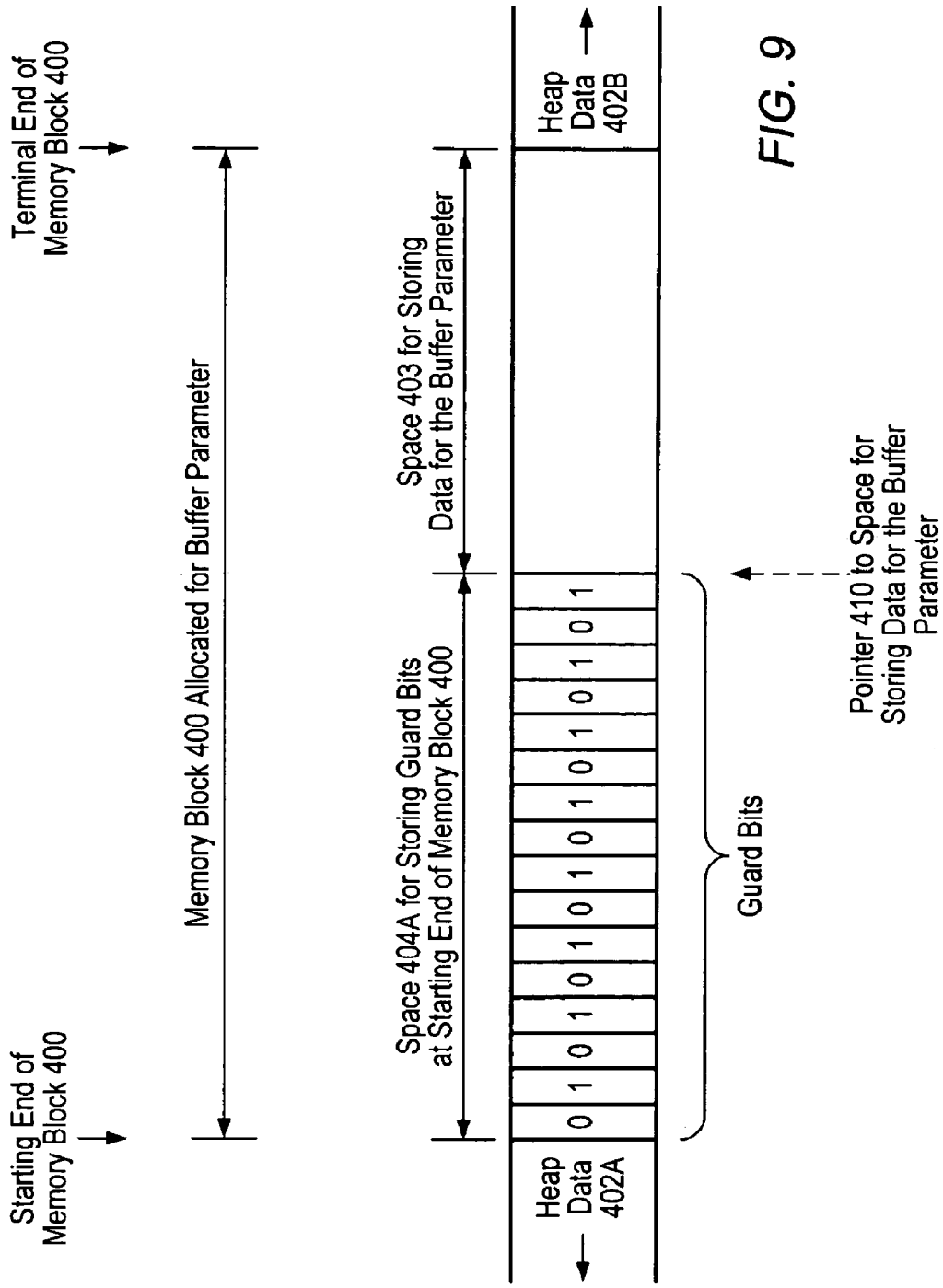

FIGS. 7-9 illustrate several exemplary embodiments of a portion of the heap showing the state of the memory block 400 after performing 309 and 311 of the flowchart of FIG. 6. The end of the memory block 400 that has the lowest memory addresses may be referred to as the "starting end". The end of the memory block 400 that has the highest memory addresses may be referred to as the "terminal end". In the illustrated diagrams of FIGS. 7-9, memory addresses may increase from left to right on the heap. Thus, the left end of the memory block 400 may be referred to as the starting end of the memory block 400, and the right end of the memory block 400 may be referred to as the terminal end of the memory block 400. Similarly, the left end of the space 403 for storing data for the buffer parameter may be referred to as the starting end of the space 403, and the right end of the space 403 for storing data for the buffer parameter may be referred to as the terminal end of the space 403.

In the embodiment illustrated in FIG. 7, guard bits have been copied into both the starting end and the terminal end of the memory block 400. In normal operation, the user-supplied code module called by the step should not write into memory locations before the starting end of the space 403 for storing data for the buffer parameter or memory locations beyond the terminal end of the space 403 for storing data for the buffer parameter.

In one embodiment the guard bits at the terminal end of the memory block 400 may be designed to automatically detect a situation where the user-supplied code module writes beyond the terminal end of the space 403 for storing data for the buffer parameter. As noted above, each of the guard bits at the terminal end of the memory block 400 may be set to an initial value. In the example of FIG. 7, an alternating pattern of 0 and 1 values is used to initialize the guard bits. In other embodiments any other desired fill pattern or bit sequence may be used to set the guard bits to their initial values. In one embodiment the pattern or bit sequence that is used may be user-configurable.

As described below, after the user-supplied code module has executed, the test executive engine 220 may check the guard bits to determine whether each of the guard bits is still set to its original value. A change in any of the guard bits at the terminal end of the memory block 400 may indicate that the user-supplied code module contains a bug that caused it to write over the guard bit, i.e., to write beyond the terminal end of the space 403 for storing data for the buffer parameter. The test executive engine 220 is preferably operable to utilize a sufficient number of guard bits and to initialize the guard bits to an appropriate fill pattern or bit sequence so that it is very unlikely that the user-supplied code module writes past the terminal end of the space 403 for storing data for the buffer parameter without changing at least one of the guard bits at the terminal end of the memory block 400, i.e., so that it is very unlikely that the overwrite will go undetected.

Similarly, in one embodiment the guard bits at the starting end of the memory block 400 may be designed to automatically detect a situation where the user-supplied code module writes before the starting end of the space 403 for storing data for the buffer parameter. A change in any of the guard bits at the starting end of the memory block 400 may indicate that the user-supplied code module contains a bug that caused it to write over the guard bit, i.e., to write before the starting end of the space 403 for storing data for the buffer parameter.

In another embodiment the guard bits at the terminal end of the memory block 400 may be designed to help prevent the heap data 402B from being corrupted (overwritten) if the user-supplied code module writes beyond the terminal end of the space 403 for storing data for the buffer parameter. Similarly, the guard bits at the starting end of the memory block 400 may be designed to help prevent the heap data 402A from being corrupted (overwritten) if the user-supplied code module writes before the starting end of the space 403 for storing data for the buffer parameter.

While a relatively small number of guard bits or guard bytes may be sufficient for detecting if the user-supplied code module writes outside the bounds of the space 403 for storing data for the buffer parameter, a larger number of guard bits or guard bytes may be required to prevent the heap data 402 from being corrupted in the event of such an overwrite. For example, if the user-supplied code module writes N bytes past the end of the space 403 for storing data for the buffer parameter and less than N guard bytes are used at the terminal end of the memory block 400 then some of the heap data 402B may be overwritten. Thus, it may not be possible for the guard bytes to prevent the heap data 402 from being overwritten in all cases, but the number of guard bytes may be chosen so that corruption of the heap data 402 is prevented in many instances. In various embodiments any number of guard bits/bytes may be appropriate for this purpose. In one embodiment the number of guard bits/bytes may be user-configurable.

FIG. 8 illustrates an embodiment in which guard bits have been copied into the terminal end of the memory block 400 but not the starting end. Thus, if the user-supplied code module writes past the end of the space 403 for storing data for the buffer parameter then the guard bits as the terminal end of the memory block 400 may enable this to be detected and may possibly prevent the user-supplied code module from corrupting heap data 402B. However since there are no guard bytes at the starting end of the memory block 400, the heap data 402A may be corrupted if the user-supplied code module writes before the beginning of the space 403 for storing data for the buffer parameter without this being detected.

FIG. 9 illustrates an embodiment in which guard bits have been copied into the starting end of the memory block 400 but not the terminal end. Thus, if the user-supplied code module writes before the beginning of the space 403 for storing data for the buffer parameter then the guard bits as the starting end of the memory block 400 may enable this to be detected and may possibly prevent the user-supplied code module from corrupting heap data 402A. However since there are no guard bytes at the terminal end of the memory block 400, the heap data 402B may be corrupted if the user-supplied code module writes past the end of the space 403 for storing data for the buffer parameter without this being detected.

Referring again now to FIG. 6, in 313 the test executive engine 220 may invoke execution of the user-supplied code module called by the step. The test executive engine 220 may pass the user-supplied code module a reference to the buffer parameter. For example, in one embodiment the user-supplied code module may be passed a pointer 410 into the memory block 400 allocated for the buffer parameter, where the pointer 410 points to the space 403 for storing data for the buffer parameter.

In various embodiments the user-supplied code module may be invoked for execution using any of various techniques and may receive the reference to the buffer parameter in any of various ways, e.g., depending on the type or implementation of the user-supplied code module. For example, where the user-supplied code module comprises a function in a DLL, the test executive engine 220 may call the function. As another example, where the user-supplied code module comprises a method of an ActiveX object, the test executive engine 220 may invoke the method. As another example, where the user-supplied code module comprises a graphical program, the test executive engine 220 may invoke execution of the graphical program. In other embodiments the test executive engine 220 may perform any of various other actions to invoke execution of the user-supplied code module, depending on the implementation of the module.

Depending on the implementation or type of the user-supplied code module, in one embodiment the module may be executed in an execution environment or an execution subsystem that is separate from the test executive application. For example, where the user-supplied code module comprises a graphical program, the module may be executed by an execution subsystem of a graphical programming system. As another example, where the user-supplied code module comprises a Java™ module, the module may be executed within a Java™ execution environment. In one embodiment the user-supplied code module may be executed in a different process other than the process in which the test executive engine 220 executes.

The user-supplied code module called by the test executive step may execute to perform any functionality and may utilize the buffer parameter in any of various ways. In one embodiment the user-supplied code module may execute to write data into the buffer parameter, e.g., into the space 403 for storing data for the buffer parameter.

In one embodiment, the test executive engine 220 may check each guard bit in the memory block 400 after the user-supplied code module called by the step finishes executing to determine whether the guard bit is still set to its initial value, as indicated in 315. As discussed above, this may enable the test executive engine 220 to determine whether the user-supplied code module wrote outside the bounds of the space 403 for storing data for the buffer parameter.

If the test executive engine 220 determines that any guard bit in the memory block 400 has changed from its initial value, i.e., determines that the user-supplied code module wrote outside the bounds of the space 403 for storing data for the buffer parameter, then the test executive engine 220 may be operable to report an error in response. In one embodiment the test executive engine 220 may stop execution of the test executive sequence and may display information on the display of the host computer 102 indicating that the user-supplied code module wrote outside the bounds of the buffer parameter and may have corrupted or overwritten data on the heap. The test executive engine 220 may also display other information on the display, such as displaying whether the user-supplied code module wrote before the start of the space 403 for storing data for the buffer parameter and/or after the end of the space 403 for storing data for the buffer parameter, displaying the data that was overwritten into the space 404 for storing guard bits for the buffer parameter, etc. In another embodiment the test executive engine 220 may continue executing the test executive sequence but may log the error, e.g., may log the error in a test results report for the test executive sequence, in a file, or in a database, etc.

In an alternative embodiment, 315 of FIG. 6 may not be performed. For example, the guard bits in the memory block 400 may prevent the user-supplied code module from corrupting heap data (in some cases) in the event of an overwrite of the buffer parameter, but the test executive engine 220 may not check to see whether an overwrite occurred.

As described above, in one embodiment the step may have "post-functionality" that is implemented by the test executive engine 220, i.e., functionality to be performed after the user-supplied code module called by the step is executed. In 317 the test executive engine 220 may execute the post-functionality of the step. In another embodiment the step may not have post-functionality, and 317 may not be performed.

As described above, in one embodiment the user-supplied code module called by the step may execute to write data into the buffer parameter, e.g., into the space 403 for storing data for the buffer parameter. In one embodiment the user-supplied code module called by the step may also execute to read data from the buffer parameter. For example, before invoking execution of the user-supplied code module, the test executive engine 220 may also copy data into the buffer parameter, i.e., into the space 403 for storing data for the buffer parameter.

As one example, the buffer parameter may correspond to a variable of the test executive engine 220, i.e., a variable known to the test executive engine 220 and created by or accessible by the test executive engine 220. For example, the user may specify various variables to be created by the test executive engine 220 when the test executive sequence is executed, and these variables may be used by the user-supplied code modules, e.g., to pass data to each other or to hold execution result values. The user may also possibly specify initial values for the variables created by the test executive engine 220.

As one example, the test executive engine 220 may create a buffer variable on the heap when the test executive sequence begins execution and may initialize the buffer variable with initialization data, e.g., a string, specified by the user. A first user-supplied code module may take the buffer variable as a parameter. When a step that calls the first user-supplied code module is executed, the test executive engine 220 may allocate a memory block 400 for the buffer parameter and copy guard bits into the memory block 400, as described above, and may also copy the data (i.e., the initialization data specified by the user) from the buffer variable into the space 403 within the memory block. Thus, the test executive engine 220 may effectively make a copy of the buffer variable on the heap, with additional guard bits surrounding (or on one side of) the copy.

The first user-supplied code module may then be invoked and may execute to write data into the buffer parameter, e.g., may change the data in the space 403 in the memory block. After the first user-supplied code module finishes execution, the test executive engine 220 may copy the data from the space 403 in the memory block back into the original buffer variable. Thus, by passing a copy of the buffer variable as the buffer parameter, data surrounding the original buffer variable on the heap may be completely protected in the event that the user-supplied code module writes outside the bounds of the buffer parameter, which may keep important test executive data safe from faulty user-supplied code modules. Also, by using guard bits for the buffer parameter, the test executive engine 220 may be able to detect if the user-supplied code module corrupts data surrounding the memory block 400 and/or may prevent the data from being corrupted.

Continuing the example, a second user-supplied code module called by another step in the test executive sequence may also take the same buffer variable as a parameter. Thus, before the second user-supplied code module is invoked for execution, the test executive engine 220 may make a copy of the buffer variable on the heap and copy the current data from the buffer variable into the copy (e.g., copy the data produced by the first user-supplied code module) before invoking execution of the second user-supplied code module, similarly as described above.

In one embodiment the test executive engine 220 may be operable to execute the test executive sequence in different modes, e.g., in either a debug mode or a production mode. In one embodiment the action taken in response to discovering that a user-supplied code module wrote beyond the bounds of the buffer parameter may depend on which mode the test executive sequence is executed in. For example, if the test executive sequence is executed in debug mode then the test executive engine 220 may stop execution of the test executive sequence immediately in response to discovering the error. If the test executive sequence is executed in production mode then the test executive engine 220 may continue executing the test executive sequence but may log the error. In one embodiment the user may be able to specify desired behavior to take in response to discovering a buffer parameter overwrite caused by a user-supplied code module. For example, the test executive software may provide a GUI panel with various options that the user can set to specify desired behavior related to discovering and handling buffer parameter overwrite errors.

In one embodiment, the test executive engine 220 may be configured to automatically detect buffer parameter overwrite errors by user-supplied code modules called by steps of the test executive sequence when the test executive sequence is executed in debug mode but not when the test executive sequence is executed in production mode. For example, when the test executive sequence is executed in production mode, space for guard bits may not be allocated when the memory block for the buffer parameter is allocated, and guard bits may not be copied into the memory block. Executing the test executive sequence without checking for buffer parameter overwrites by user-supplied code modules may increase execution performance of the test executive sequence. In one embodiment the user may be able to turn buffer parameter overwrite detection on and off as desired (either for the entire test executive sequence or for user-supplied code modules called by individual steps in the test executive sequence), or the user may specify that buffer parameter overwrite detection should only be performed when executing the test executive sequence in certain execution modes, e.g., in debug mode. For example, the user may interact with a GUI panel to set these options.

In one embodiment a user-supplied code module that takes a buffer parameter may be intended to read data from the buffer parameter but not write data into the buffer parameter. For example, the user may set an option to specify that the buffer parameter is a constant or a read-only parameter, or the user-supplied code module may have a prototype indicating that the buffer parameter is read-only parameter. In one embodiment, if the buffer parameter is indicated as a read-only parameter then the test executive engine 220 may not utilize guard bits for the buffer parameter. In another embodiment the test executive engine 220 may still utilize guard bits for the buffer parameter in case the user-supplied code module writes data into the buffer parameter even though it is not supposed to do so.

The above-described method of automatically detecting and/or preventing buffer parameter overwrite errors caused by user-supplied code modules called by steps of a test executive sequence may benefit users by informing them of bugs in their code modules of which they were not aware, by preventing the bugs from corrupting heap data during execution of the test executive sequence, and/or by helping the users track down the source of a problem encountered during execution of the test executive sequence.

Although the method is described above in terms of a user-supplied code module that takes one buffer parameter, it is noted that a user-supplied code module may also take multiple buffer parameters. In this instance, for each buffer parameter, the test executive engine 220 may allocate a memory block, copy guard bits into one or more ends of the memory block, and check the guard bits for changes after execution of the user-supplied code module, similarly as described above. It is noted that steps that call user-supplied code modules that do not take buffer parameters may be executed similarly as described above, but without the test executive engine 220 performing the operations associated with buffer parameters, e.g., without performing 309, 311, and 315 of FIG. 6.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer accessible memory medium comprising program instructions executable to:
   include a first test executive step in a test executive sequence in response to user input;
   configure the first test executive step to call a first user-supplied code module, wherein the first user-supplied code module uses a buffer parameter; and
   execute the test executive sequence, wherein said executing comprises executing the first test executive step in the test executive sequence;
   wherein said executing the first test executive step comprises:
   allocating a memory block for the buffer parameter from a heap, wherein said allocating the memory block comprises allocating space for storing data for the buffer parameter and space for storing guard bits for the buffer parameter;

copying one or more guard bits into at least one end of the memory block; and invoking execution of the first user-supplied code module called by the first test executive step, wherein said invoking execution of the first user-supplied code module comprises passing the first user-supplied code module a pointer into the memory block for the buffer parameter;

wherein the one or more guard bits are useable for one or more of detecting if the first user-supplied code module writes outside the space for storing data for the buffer parameter and/or preventing the first user-supplied code module from corrupting data on the heap if the first user-supplied code module writes outside the space for storing data for the buffer parameter;

wherein said executing the test executive sequence comprises executing the test executive sequence under control of a test executive engine, and wherein, in executing the first test executive step, the test executive engine performs said allocating the memory block, said copying the one or more guard bits, and said invoking execution of the first user-supplied code module called by the first test executive step.

2. The computer accessible memory medium of claim 1, wherein each guard bit copied into the memory block has an initial value;

wherein said executing the first test executive step further comprises checking each guard bit in the memory block after the first user-supplied code module called by the first test executive step finishes executing to determine whether the guard bit is still set to its initial value.

3. The computer accessible memory medium of claim 2, wherein the program instructions are further executable to report an error in response to determining that a guard bit in the memory block changed during execution of the first user-supplied code module called by the first test executive step.

4. The computer accessible memory medium of claim 2, wherein the program instructions are further executable to stop execution of the test executive sequence in response to determining that a guard bit in the memory block changed during execution of the first user-supplied code module called by the first test executive step.

5. The computer accessible memory medium of claim 1, wherein the pointer into the memory block for the buffer parameter points to the space for storing data for the buffer parameter.

6. The computer accessible memory medium of claim 1, wherein said copying one or more guard bits into at least one end of the memory block comprises copying a plurality of guard bits at a starting end of the memory block, wherein the guard bits at the starting end of the memory block prevent the first user-supplied code module from corrupting heap data if the first user-supplied code module writes before the space for storing data for the buffer parameter;

wherein said passing the first user-supplied code module a pointer into the memory block as the buffer parameter comprises passing the first user-supplied code module a pointer into a position immediately after the guard bits at the starting end of the memory block.

7. The computer accessible memory medium of claim 1, wherein said copying one or more guard bits into at least one end of the memory block comprises copying one or more guard bits at a starting end of the memory block, wherein the one or more guard bits at the starting end of the memory block are useable for detecting if the first user-supplied code module writes before the space for storing data for the buffer parameter;

wherein said passing the first user-supplied code module a pointer into the memory block as the buffer parameter comprises passing the first user-supplied code module a pointer into a position immediately after the one or more guard bits at the starting end of the memory block.

8. The computer accessible memory medium of claim 1, wherein said copying one or more guard bits into at least one end of the memory block comprises copying a plurality of guard bits at a terminal end of the memory block, wherein the guard bits at the terminal end of the memory block prevent the first user-supplied code module from corrupting heap data if the first user-supplied code module writes beyond the space for storing data for the buffer parameter.

9. The computer accessible memory medium of claim 1, wherein said copying one or more guard bits into at least one end of the memory block comprises copying one or more guard bits at a terminal end of the memory block, wherein the one or more guard bits at the terminal end of the memory block are useable for detecting if the first user-supplied code module writes beyond the space for storing data for the buffer parameter.

10. The computer accessible memory medium of claim 1, wherein said one or more copying guard bits into at least one end of the memory block comprises copying a plurality of guard bits at a starting end of the memory block and copying a plurality of guard bits at a terminal end of the memory block;

wherein the guard bits at the starting end of the memory block prevent the first user-supplied code module from corrupting heap data if the first user-supplied code module writes before the space for storing data for the buffer parameter;

wherein the guard bits at the terminal end of the memory block prevent the first user-supplied code module from corrupting heap data if the first user-supplied code module writes beyond the space for storing data for the buffer parameter.

11. The computer accessible memory medium of claim 10, wherein the space for storing data for the buffer parameter comprises space between the guard bits at the starting end of the memory block and the guard bits at the terminal end of the memory block;

wherein said invoking execution of the first user-supplied code module comprises passing the first user-supplied code module a pointer that points to the beginning of the space between the guard bits at the starting end of the memory block and the guard bits at the terminal end of the memory block.

12. The computer accessible memory medium of claim 1, wherein said copying one or more guard bits into at least one end of the memory block comprises copying one or more guard bits at a starting end of the memory block and copying one or more guard bits at a terminal end of the memory block;

wherein the one or more guard bits at the starting end of the memory block are useable for detecting if the first user-supplied code module writes before the space for storing data for the buffer parameter;

wherein the one or more guard bits at the terminal end of the memory block are useable for detecting if the first user-supplied code module writes beyond the space for storing data for the buffer parameter.

13. The computer accessible memory medium of claim 1,
wherein the first test executive step has pre-functionality, wherein the pre-functionality for the first test executive step comprises functionality to be performed before invoking execution of the first user-supplied code module called by the first test executive step;
wherein said executing the first test executive step further comprises executing the pre-functionality of the first test executive step before said invoking execution of the first user-supplied code module called by the first test executive step.

14. The computer accessible memory medium of claim 1,
wherein the first test executive step has post-functionality, wherein the post-functionality for the first test executive step comprises functionality to be performed after the first user-supplied code module called by the first test executive step finishes executing;
wherein said executing the first test executive step further comprises executing the post-functionality of the first test executive step after the first user-supplied code module called by the first test executive step finishes executing.

15. The computer accessible memory medium of claim 1,
wherein the program instructions are further executable to display a graphical user interface for creating the test executive sequence;
wherein said including the first test executive step in the test executive sequence is performed in response to user input received to the graphical user interface requesting inclusion of the first test executive step in the test executive sequence.

16. The computer accessible memory medium of claim 1,
wherein the program instructions are further executable to display a graphical user interface for configuring the first test executive step;
wherein the first test executive step is configured to call the first user-supplied code module in response to user input received to the graphical user interface for configuring the first test executive step, wherein the user input specifies the first user-supplied code module.

17. The computer accessible memory medium of claim 1, wherein said invoking execution of the first user-supplied code module called by the first test executive step comprises one of:
calling a function in a dynamic linked library (DLL);
invoking a method of an ActiveX object; or
invoking execution of a graphical program.

18. A computer accessible memory medium comprising program instructions executable to:
include a plurality of test executive steps in a test executive sequence in response to user input;
configure each of the test executive steps to call a user-supplied code module in response to user input; and
execute the test executive sequence, wherein said executing comprises executing each of the test executive steps in the test executive sequence;
wherein said including the plurality of test executive steps in the test executive sequence in response to user input comprises including a first test executive step in the test executive sequence in response to user input;
wherein said configuring each of the test executive steps to call a user-supplied code module in response to user input comprises configuring the first test executive step to call a first user-supplied code module, wherein the first user-supplied code module takes a buffer parameter;
wherein executing the first test executive step comprises:
allocating a memory block for the buffer parameter from a heap, wherein said allocating the memory block comprises allocating space for storing data for the buffer parameter and space for storing guard bits for the buffer parameter;
copying guard bits into at least one end of the memory block, wherein each guard bit has an initial value, wherein the guard bits prevent the first user-supplied code module from corrupting data on the heap if the first user-supplied code module writes outside the space for storing data for the buffer parameter; and
invoking execution of the first user-supplied code module called by the first test executive step, wherein said invoking execution of the first user-supplied code module comprises passing the first user-supplied code module a pointer into the memory block for the buffer parameter, wherein the pointer points to the space for storing data for the buffer parameter;
wherein said executing the test executive sequence comprises executing the test executive sequence under control of a test executive engine, and wherein, in executing the first test executive step, the test executive engine performs said allocating the memory block, said copying the one or more guard bits, and said invoking execution of the first user-supplied code module called by the first test executive step.

19. A computer accessible memory medium comprising program instructions executable to:
include a plurality of test executive steps in a test executive sequence in response to user input;
configure each of the test executive steps to call a user-supplied code module in response to user input; and
execute the test executive sequence, wherein said executing comprises executing each of the test executive steps in the test executive sequence;
wherein said including the plurality of test executive steps in the test executive sequence in response to user input comprises including a first test executive step in the test executive sequence in response to user input;
wherein said configuring each of the test executive steps to call a user-supplied code module in response to user input comprises configuring the first test executive step to call a first user-supplied code module, wherein the first user-supplied code module takes a buffer parameter;
wherein executing the first test executive step comprises:
allocating a memory block for the buffer parameter from a heap, wherein said allocating the memory block comprises allocating space for storing data for the buffer parameter and space for storing guard bits for the buffer parameter;
copying guard bits into at least one end of the memory block, wherein each guard bit has an initial value, wherein the guard bits are useable for detecting if the first user-supplied code module writes outside the space for storing data for the buffer parameter; and
invoking execution of the first user-supplied code module called by the first test executive step, wherein said invoking execution of the first user-supplied code module comprises passing the first user-supplied code module a pointer into the memory block for the buffer parameter, wherein the pointer points to the space for storing data for the buffer parameter;

wherein said executing the test executive sequence comprises executing the test executive sequence under control of a test executive engine, and wherein, in executing the first test executive step, the test executive engine performs said allocating the memory block, said copying the one or more guard bits, and said invoking execution of the first user-supplied code module called by the first test executive step.

20. A computer accessible memory medium comprising program instructions executable to:
include a first test executive step in a test executive sequence in response to user input;
configure the first test executive step to call a first user-supplied code module, wherein the first user-supplied code module uses a buffer parameter; and
execute the test executive sequence, wherein said executing comprises executing the first test executive step in the test executive sequence;
wherein said executing the first test executive step comprises:
allocating a memory block for the buffer parameter from a heap, wherein said allocating the memory block comprises allocating space for storing data for the buffer parameter and space for storing guard bits for the buffer parameter;
copying one or more guard bits into a starting end of the memory block; and
copying one or more guard bits into a terminal end of the memory block;
wherein the space for storing data for the buffer parameter comprises space between the guard bits at the starting end of the memory block and the guard bits at the terminal end of the memory block;
wherein the guard bits at the starting end of the memory block are useable for one or more of detecting if the first user-supplied code module writes before the space for storing data for the buffer parameter and/or preventing the first user-supplied code module from corrupting heap data if the first user-supplied code module writes before the space for storing data for the buffer parameter;
wherein the guard bits at the terminal end of the memory block are useable for one or more of detecting if the first user-supplied code module writes beyond the space for storing data for the buffer parameter and/or preventing the first user-supplied code module from corrupting heap data if the first user-supplied code module writes beyond the space for storing data for the buffer parameter;
wherein executing the first test executive step further comprises:
invoking execution of the first user-supplied code module called by the first test executive step, wherein said invoking execution of the first user-supplied code module comprises passing the first user-supplied code module a pointer to the space for storing data for the buffer parameter;
wherein said executing the test executive sequence comprises executing the test executive sequence under control of a test executive engine, and wherein, in executing the first test executive step, the test executive engine performs said allocating the memory block, said copying one or more guard bits into a starting end of the memory block, said copying one or more guard bits into a terminal end of the memory block, and said invoking execution of the first user-supplied code module called by the first test executive step.

21. A computer-implemented method comprising:
including a first test executive step in a test executive sequence in response to user input;
configuring the first test executive step to call a first user-supplied code module, wherein the first user-supplied code module uses a buffer parameter; and
executing the test executive sequence, wherein said executing comprises executing the first test executive step in the test executive sequence;
wherein said executing the first test executive step comprises:
allocating a memory block for the buffer parameter from a heap, wherein said allocating the memory block comprises allocating space for storing data for the buffer parameter and space for storing guard bits for the buffer parameter;
copying one or more guard bits into at least one end of the memory block; and
invoking execution of the first user-supplied code module called by the first test executive step, wherein said invoking execution of the first user-supplied code module comprises passing the first user-supplied code module a pointer into the memory block for the buffer parameter;
wherein the one or more guard bits are useable for one or more of detecting if the first user-supplied code module writes outside the space for storing data for the buffer parameter and/or preventing the first user-supplied code module from corrupting data on the heap if the first user-supplied code module writes outside the space for storing data for the buffer parameter;
wherein said executing the test executive sequence comprises executing the test executive sequence under control of a test executive engine, and wherein, in executing the first test executive step, the test executive engine performs said allocating the memory block, said copying the one or more guard bits, and said invoking execution of the first user-supplied code module called by the first test executive step.

22. The method of claim 21,
wherein each guard bit copied into the memory block has an initial value;
wherein said executing the first test executive step further comprises checking each guard bit in the memory block after the first user-supplied code module called by the first test executive step finishes executing to determine whether the guard bit is still set to its initial value.

23. The method of claim 21,
wherein said copying one or more guard bits into at least one end of the memory block comprises copying a plurality of guard bits at a starting end of the memory block, wherein the guard bits at the starting end of the memory block prevent the first user-supplied code module from corrupting heap data if the first user-supplied code module writes before the space for storing data for the buffer parameter;
wherein said passing the first user-supplied code module a pointer into the memory block as the buffer parameter comprises passing the first user-supplied code module a pointer into a position immediately after the guard bits at the starting end of the memory block.

24. The method of claim 21,
wherein said copying one or more guard bits into at least one end of the memory block comprises copying one or more guard bits at a starting end of the memory block, wherein the one or more guard bits at the starting end of the memory block are useable for detecting if the first user-supplied code module writes before the space for storing data for the buffer parameter;

wherein said passing the first user-supplied code module a pointer into the memory block as the buffer parameter comprises passing the first user-supplied code module a pointer into a position immediately after the one or more guard bits at the starting end of the memory block.

25. The method of claim 21, wherein said copying one or more guard bits into at least one end of the memory block comprises copying a plurality of guard bits at a terminal end of the memory block, wherein the guard bits at the terminal end of the memory block prevent the first user-supplied code module from corrupting heap data if the first user-supplied code module writes beyond the space for storing data for the buffer parameter.

26. The method of claim 21, wherein said copying one or more guard bits into at least one end of the memory block comprises copying one or more guard bits at a terminal end of the memory block, wherein the one or more guard bits at the terminal end of the memory block are useable for detecting if the first user-supplied code module writes beyond the space for storing data for the buffer parameter.

27. The method of claim 21, wherein said copying one or more guard bits into at least one end of the memory block comprises copying a plurality of guard bits at a starting end of the memory block and copying a plurality of guard bits at a terminal end of the memory block;

wherein the guard bits at the starting end of the memory block prevent the first user-supplied code module from corrupting heap data if the first user-supplied code module writes before the space for storing data for the buffer parameter;

wherein the guard bits at the terminal end of the memory block prevent the first user-supplied code module from corrupting heap data if the first user-supplied code module writes beyond the space for storing data for the buffer parameter.

28. The method of claim 21, wherein said copying one or more guard bits into at least one end of the memory block comprises copying one or more guard bits at a starting end of the memory block and copying one or more guard bits at a terminal end of the memory block;

wherein the one or more guard bits at the starting end of the memory block are useable for detecting if the first user-supplied code module writes before the space for storing data for the buffer parameter;

wherein the one or more guard bits at the terminal end of the memory block are useable for detecting if the first user-supplied code module writes beyond the space for storing data for the buffer parameter.

29. The method of claim 21, wherein the first test executive step has pre-functionality, wherein the pre-functionality for the first test executive step comprises functionality to be performed before invoking execution of the first user-supplied code module called by the first test executive step;

wherein said executing the first test executive step further comprises executing the pre-functionality of the first test executive step before said invoking execution of the first user-supplied code module called by the first test executive step.

30. The method of claim 21, wherein the first test executive step has post-functionality, wherein the post-functionality for the first test executive step comprises functionality to be performed after the first user-supplied code module called by the first test executive step finishes executing;

wherein said executing the first test executive step further comprises executing the post-functionality of the first test executive step after the first user-supplied code module called by the first test executive step finishes executing.

31. The method of claim 21, wherein said executing the test executive sequence comprises executing the test executive sequence under control of a test executive engine;

wherein, in executing the first test executive step, the test executive engine is operable to perform said allocating the memory block, said copying the guard bits, and said invoking execution of the first user-supplied code module called by the first test executive step.

32. A system comprising:

a sequence editor;

a test executive engine;

a host computer operable to execute the sequence editor and the test executive engine; and a unit under test (UUT) coupled to the host computer;

wherein the host computer is operable to execute the sequence editor to create a test executive sequence for testing the UUT, wherein said creating the test executive sequence comprises including a plurality of test executive steps in the test executive sequence in response to user input to the sequence editor and configuring each of the test executive steps to call a user-supplied code module in response to user input to the sequence editor;

wherein said including the plurality of test executive steps in the test executive sequence in response to user input to the sequence editor comprises including a first test executive step in the test executive sequence in response to user input to the sequence editor;

wherein said configuring each of the test executive steps to call a user-supplied code module in response to user input to the sequence editor comprises configuring the first test executive step to call a first user-supplied code module, wherein the first user-supplied code module takes a buffer parameter;

wherein the host computer is further operable to execute the test executive engine, wherein the test executive engine is operable to control execution of the test executive sequence, wherein said controlling execution of the test executive sequence comprises causing each of the test executive steps in the test executive sequence to be executed on the host computer;

wherein for the first test executive step, the test executive engine is operable to:

allocate a memory block for the buffer parameter from a heap, wherein said allocating the memory block comprises allocating space for storing data for the buffer parameter and space for storing guard bits for the buffer parameter;

copy guard bits into at least one end of the memory block, wherein each guard bit has an initial value, wherein the guard bits are useable for one or more of detecting if the first user-supplied code module writes outside the space for storing data for the buffer parameter and/or preventing the first user-supplied code module from corrupting data on the heap if the first user-supplied code module writes outside the space for storing data for the buffer parameter; and invoke execution of the first user-supplied code module called by the first test executive step, wherein said invoking execution of the first user-supplied code module comprises passing the first user-supplied code module a pointer into the memory block for the buffer parameter, wherein the pointer points to the space for storing data for the buffer parameter.

\* \* \* \* \*